United States Patent [19]

Friedman et al.

[11] 4,446,412

[45] May 1, 1984

[54] METHOD AND APPARATUS FOR CONTROLLING STEPPER MOTORS

[75] Inventors: David Friedman, Bedford; Philip Mandel, Burlington, both of Mass.

[73] Assignee: Computervision Corporation, Bedford, Mass.

[21] Appl. No.: 319,665

[22] Filed: Nov. 9, 1981

[51] Int. Cl.³ ............................................ H02K 29/02
[52] U.S. Cl. ..................................... 318/696; 318/685
[58] Field of Search ........................ 318/612, 685, 696

[56] References Cited

U.S. PATENT DOCUMENTS

| | | | |
|---|---|---|---|
| 3,482,155 | 12/1969 | Fredriksen | 318/685 |
| 3,541,418 | 11/1970 | Agin et al. | 318/612 |
| 3,660,746 | 5/1972 | Milek | 318/696 |
| 4,286,202 | 8/1981 | Clancy et al. | 318/685 |
| 4,349,770 | 9/1982 | Rogen | 318/685 |

*Primary Examiner*—G. Z. Rubinson
*Assistant Examiner*—Saul M. Bergmann
*Attorney, Agent, or Firm*—Richard J. Birch

[57] ABSTRACT

A method and apparatus for controlling a stepper motor involves the generation of command currents which drive the stepper motor and provided critical damping of the natural resonance of the stepper motor. Digital error signals are developed by selectively combining a position signal and a digital velocity signal which is derived from a feedback signal proportional to velocity. In one embodiment, the digital error signals are converted into command currents for driving the stepper motor in such a manner as to achieve damping of the motor's natural resonance. In an anternative embodiment, the digital error signals and feed forward acceleration signals and/or feed forward velocity signals are converted into command currents for driving the stepper motor so as to achieve damping of the motor's natural resonance, as well as correction for positional errors induced by either velocity or acceleration.

12 Claims, 5 Drawing Figures

METHOD AND APPARATUS FOR CONTROLLING STEPPER MOTORS

BACKGROUND OF THE INVENTION

1. Field of the Invention

The present invention relates to stepper motors and, more particularly, is directed towards a method and apparatus for critically damping the natural resonance of a stepper motor.

2. Description of the Prior Art

Stepper motor drive systems energize the field windings of a stepper motor in a step-by-step sequence which causes the armature of the motor to rotate in a corresponding step-by-step manner. Such systems have been designed for full step and fractional step operation, the smaller steps providing finer resolution. U.S. Pat. No. 4,042,868 discloses a stepper motor control circuit which utilizes a duty cycle converter for converting an input analog signal to a velocity squared feedback signal. U.S. Pat. No. 3,628,119 shows a stepper motor control system in which feedback signals are logically combined with acceleration and deceleration pulses. U.S. Pat. No. 4,095,157 teaches the use of a bi-directional pulse generator and up/down counters for controlling a stepper motor. U.S. Pat. Nos. 3,924,721; 4,147,968 and 4,151,448 disclose stepper motor control system utilizing feedback and command signals in conjunction with comparators. U.S. Pat. No. 3,868,557 shows a stepper motor damping apparatus in which a tachometer signal is converted to a binary signal. U.S. Pat. No. 4,140,956 discloses a stepper motor control circuit in which stepper motor drive signals are developed from multi-step function position command signals. U.S. Pat. No. 4,091,316, which is assigned to the assignee of the present invention, discloses a stepper motor drive system in which tachometer feedback is used to modulate the phase angle of stepper motor command currents for damping the basic stepper motor resonance.

Generally, stepper motor drive systems suffer from the disadvantages of vibration and loss of synchronism. Vibration occurs when the step rate is matched to motor resonance and when a cyclic current waveshape matches motor resonance. Analysis of tachometer signals indicates that loss of synchronism is due to vibration which starts at the motor shaft frequency and slowly builds in amplitude until the system is eventually knocked out of synchronism. Each of these disadvantages are related to extremely underdamped mechanical shaft resonance.

SUMMARY OF THE INVENTION

It is an object of the present invention to provide a method and apparatus for damping stepping motors which does not suffer from the heretofore mentioned disadvantages.

It is another object of the present invention to provide a method and apparatus for critically damping the natural resonance of a stepper motor. Command currents for driving the stepper motor are developed from a velocity feedback signal which is derived from a tachometer and a digital position signal from a step rate generator. The velocity signals and the position signals are fed to a digital subtractor for generation of digital error signals. These error signals are applied to the windings of the stepper motor through respective PROM memory circuits and digital to analog converters for generation of the command currents which drive the stepper motor.

It is a further object of the present invention to provide a method and apparatus for critically damping the natural resonance of a stepper motor. Command currents for driving the stepper motor are developed from a digitally processed velocity error signal and a digital feed forward acceleration signal. A digital position signal from a step rate generator and a velocity signal from a tachometer are fed to a digital subtractor for generation of the error signal. The digital error signal generated by the digital subtractor and the feed forward acceleration signal are applied to the windings of the stepper motor through respective PROM memory circuits and digital to analog converters for generation of the command currents which drive the stepper motor.

Other objects of the present invention will in part be obvious and will in part appear hereinafter.

The invention accordingly comprises the apparatus and processes, together with their parts, elements, steps and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following description taken in connection with the accompanying drawings, wherein.

DESCRIPTION OF THE PREFERRED EMBODIMENTS

Figure 1:
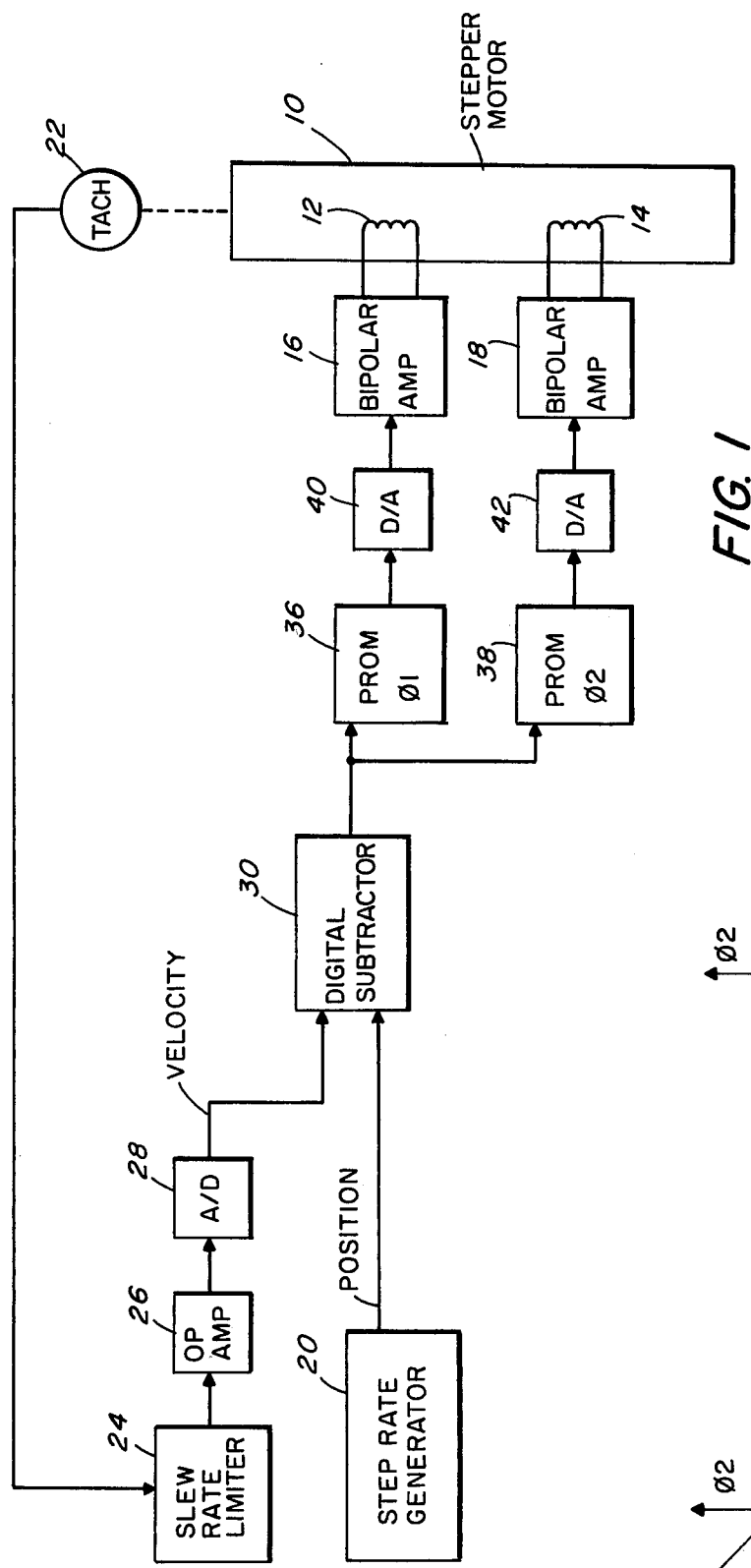
FIG. 1 is a block and schematic diagram of a drive system and associated stepper motor embodying the present invention.
Figure 3:
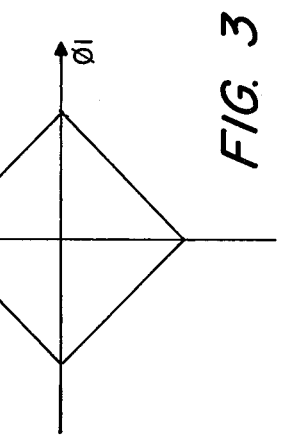
FIG. 3 is a graphic representation illustrating certain principles of the present invention.

Referring now to the drawings, particularly FIG. 1, there is shown a system for critically damping the natural resonance of a stepper motor 10, for example a two phase stepper motor that is controlled by interpolated command currents to produce desired intermediate angular positions. Stepper motor 10 has two drive coils 12 and 14 which are energized by phase ONE ($\phi 1$) and phase TWO ($\phi 2$) command currents from linear bipolar amplifiers 16 and 18, respectively. The command currents, which are phase shifted 90° as shown in FIG. 3, are derived from a position signal generated from a cyclic device 20 such as a step rate generator and a velocity signal generated by a tachometer 22. In alternative embodiments, the velocity signal is derived from means other than a tachometer, for example an optical encoder. Tachometer 22 is connected to the shaft of stepper motor 10 and generates an analog signal that is proportional to the rotational velocity of the shaft. This analog signal passes through a slew rate limiter 24 and an operational amplifier 26 and then is converted into a digital signal of corresponding values in an analog to digital converter 28. Slew rate limiter 24 functions as a low-pass filter without phase shift and the system is insensitive to tachometer brush noise because of this characteristic of the slew rate limiter. The digital signal at the output of analog to digital converter 28, which is the digital velocity signal, is applied to an inverting input of a digital subtractor 30.

A position signal at an output of step rate generator 20, for example a counter, is applied to a non-inverting input of digital subtractor 30. Digital error signals at the output of digital subtractor 30 are applied to an input of a phase ONE memory 36 and an input of a phase TWO memory 38. Memories 36 and 38, for example programmable read only memories (PROMS), are used to control the actual interpolated command current values. The signals at the output of PROMS 36 and 38 are converted into corresponding analog signals in digital to analog converters 40 and 42, respectively. The analog signal at the output of digital to analog converter 40 is applied to bipolar amplifier 16 and the analog signal at the output of digital to analog converter 42 is applied to bipolar amplifier 18. Command currents at the output of bipolar amplifiers 16 and 18 are applied to motor windings 12 and 14, respectively, for driving stepper motor 10.

Figure 2:
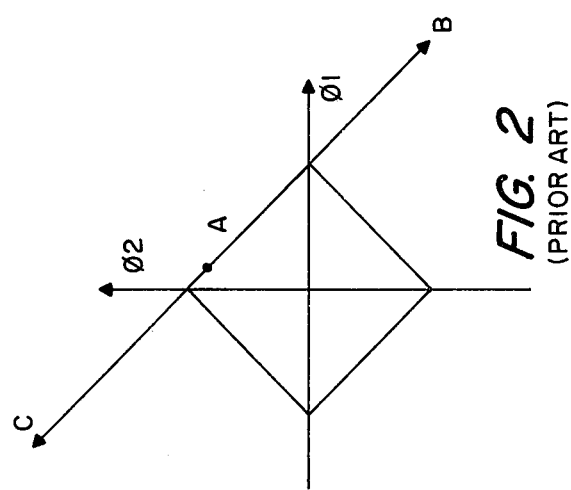
FIG. 2 is a graphic representation illustrating certain principles of prior art stepper motor drive systems.

Referring now to FIGS. 2 and 3, there are shown vector diagrams of two phase command current signals that are phase shifted 90° with respect to each other, stepper motor 10 being driven by such command currents. In the digital implementation, each leg of the illustrated diamond graphs is stepped rather than straight due to quantization. In the preferred embodiment, there are sixty-four micro-steps from peak to peak or sixteen micro-steps on each leg of the diamonds. It will be readily apparent that the number of micro-steps could theoretically be any desired number. In prior art drive systems, feedback takes effect only along a particular leg of the diamond as illustrated in FIG. 2. For example, if a command motor phase is represented by point A, then the feedback only affects the motor currents along the vector denoted B-C.

Feedback of this type imposes severe limitations on the amount of damping that can be attained and results in a system of limited dynamic range. If the corners of the diamond represent the maximum allowed current, only sixteen micro-steps of lag due to feedback can be achieved, each leg of the diamond having sixteen micro-steps. Any feedback which results in motor currents outside the bounds of the diamond produces excessive power which is dissipated by the motor windings. Dissipation of this excessive power may cause overheating and premature failure of the stepper motor.

In addition to limited dynamic range, such prior art drive systems are characterized by poor linearity. By way of example, it is assumed that the corners of the diamond in FIG. 2 are at a distance of sixteen arbitrary units of current from the origin. It is also assumed that point A, the instantaneous commanded shaft position, is at coordinates (2,14), $\phi1=2$ and $\phi2=14$, and that the stepper motor is spinning at a velocity such that the feedback requires a lag of 18 micro-steps in the counterclockwise direction of the diamond. In the ideal case, this would require the motor currents to be at point (−16,0). In the prior art system depicted in FIG. 2, the actual motor currents would be at (−16, 32). Aside from the excessive current required by $\phi2=32$, it is evident that a severe non-linearity exists. The vector from the origin to point (−16, 32) intersects the diamond at (−5⅓, 10⅔) which is nearly eleven micro-steps away from the ideal position of (−16,0). If point A had been at (16,0), the non-linearity would have been less because the desired point would have been (−2,14), whereas the actual point (−2, 18) would have been closed to the desired point. Hence, the non-linearity is not even consistent with itself.

The present invention capitalizes on the characteristics of digital systems to achieve the ideal case, both in terms of dynamic range and linearity. Digital circuits have a modulus which, if properly implemented, is cyclical ad infinitum. For example, a digital counter can count up to its maximum count, overflow to zero, count back up to maximum, overflow, etc. Given the exact same number of down-counting pulses, the counter will cycle backwards and end in the state in which it started. A digital counter and a digital subtractor operate in a similar manner. The output of a digital subtractor will cycle repetitively through a given range for an increasing input. In the present invention, increasing feedback causes the motor currents to walk around the diamond rather than walk along one leg of the diamond. Indeed, the feedback causes walking around the diamond several complete rotations, if necessary to result in the desired lag. Therefore, the system is perfectly linear and has theoretically infinite dynamic range at all positions, speeds, accelerations, and feedback gains as long as the operational amplifiers and the analog to digital converters are linear and operated within their respective dynamic ranges.

Due to the linearity of the system taught by the present invention, a two-axis is multi-axis system incorporating such teachings can achieve extremely good matching between axes. For example, in a two-axis plotter, if the X axis is commanded to run half as fast as the Y axis on a given vector, the lag due to feedback must be exactly half in X as it is for Y in order to avoid an error in the instantaneous position.

The limited dynamic range of prior art systems resulted in low levels of velocity and acceleration. Since the feedback gain has to be kept low enough to allow a reasonable top velocity within the small dynamic range, it follows that the acceleration must be severely limited since the servo cannot be operated anywhere near critical damping. High acceleration would cause severe ringing with associated positional errors, as well as a high probability of losing synchronization with the motor phase. On the other hand, the present invention allows critical damping to be achieved because of its expanded dynamic range. Hence, high acceleration is achieved without ringing and with lower probability of losing synchronization. It can be assumed that the open loop transfer function of the stepper motor alone is approximated by:

$$\frac{X \text{ out}}{X \text{ in}} = \frac{1}{\frac{s^2}{\omega_o^2} + 1}$$

According to the teachings of the present invention, the transfer function equation for the system shown in FIG. 1 is:

$$\frac{X \text{ out}}{X \text{ in}} = \left( \frac{\frac{1}{\frac{s^2}{\omega_o^2} + 1}}{1 + \frac{sk_f}{\frac{s^2}{\omega_o^2} + 1}} \right)$$

Where:
X out is the output position or actual position of the motor shaft;
X in is the desired position;
$\omega_o$ is the resonant frequency; and
$K_f$ is the feedback gain
The damped system response at critical damping is:

$$\frac{X \text{ out}}{X \text{ in}} = \frac{1}{\left( \frac{s}{\omega_o} + 1 \right)^2} \quad (2)$$

if the feedback gain $(K_f) = 2/\omega_o$.

Figure 4:
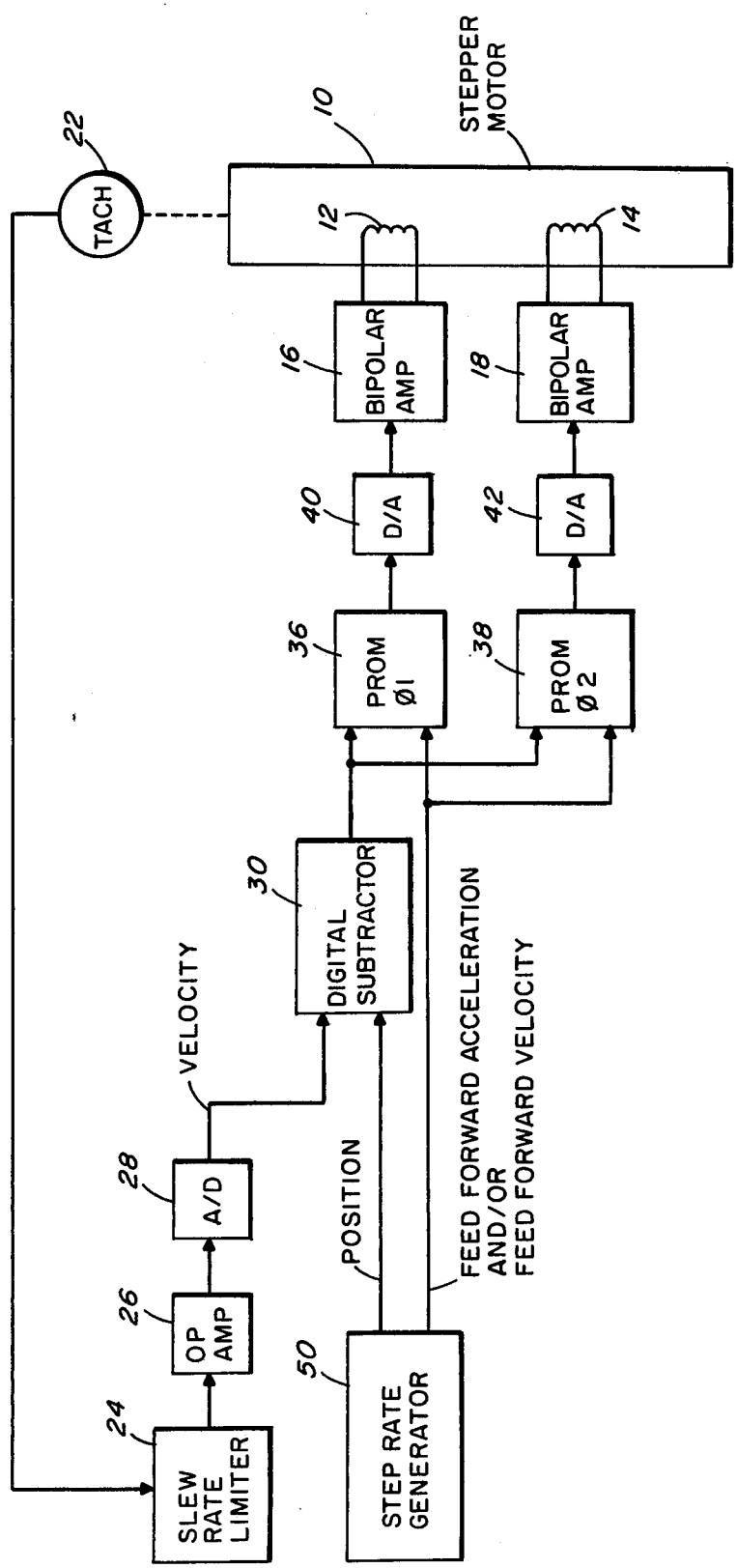
FIG. 4 is a block and schematic diagram illustrating an alternative embodiment of the present invention.

Referring now to FIG. 4, there is shown an alternative system for critically damping the natural resonance of stepper motor 10 and for compensating for lag. Corresponding elements in FIGS. 1 and 4 have been assigned like reference characters. The command currents from linear bipolar amplifiers 16 and 18 are derived from a digital feed forward acceleration signal and/or a feed forward velocity signal generated by a digital device 50 such as step rate generator 20, and the digital error signal generated by digital subtractor 30. The feed forward acceleration signal is utilized to anticipate lag due to acceleration and the feed forward velocity signal is used to compensate for positional lag due to feedback. In the illustrated embodiment, step rate generator 50 is provided with means for generating the position signals, the feed forward acceleration signal and the feed forward velocity signals.

The digital velocity signal at the output of analog to digital converter 28 is applied to the inverting input of digital subtractor 30 and the position signal at one output of step rate generator 50 is fed to the non-inverting input of digital subtractor 30. The error signal at the output of digital subtractor 30 is applied to the inputs of PROMS 36 and 38. The feed forward acceleration signal generated by digital device 50 is applied to another input of each PROM 36 and 38. Digital signals at the output of each PROM 36 and 38 are converted into corresponding analog signals by digital to analog converters 40 and 42, respectively. The analog signal at the output of digital to analog converter 40 is applied to motor winding 12 via bipolar amplifier 16 and the analog signal at the output of digital to analog converter 42 is applied to motor winding 14 via bipolar amplifier 18. In an alternative embodiment, the error signal at the output of digital subtractor 30 and the feed forward signal generated by digital device 50 are applied to digital adders and the signals at the output of the adders are applied to the PROM 36 and 38.

Figure 5:
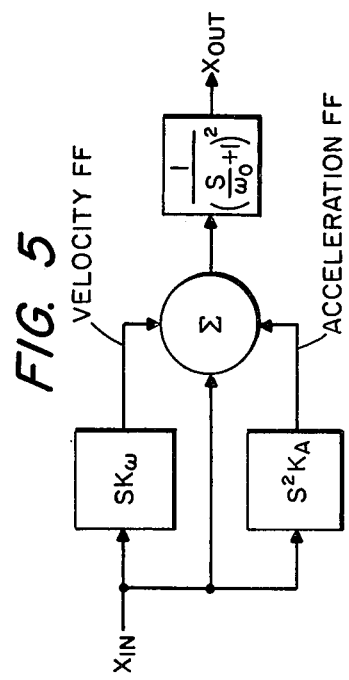
FIG. 5 is a block diagram illustrating the system of FIG. 4 less the tachometer feedback.

At critical damping, the illustrated system has a classical double pole and, therefore, has lag. This lag is eliminated by feeding forward both the feed forward velocity signal which is proportional to rate and the feed forward acceleration signal which is proportional to acceleration. The lag due to acceleration occurs when stepper motor 10 is attempting to accelerate its load, and if not compensated for, contributes to the classical problem of falling out of synchronism. The present invention provides means which anticipates the acceleration requirement in a digitally controlled fashion by forming a digital control signal. The numerical value of this signal is proportional to the acceleration required and is therefore referred to as the feed forward acceleration signal (FF). As previously indicated, this FF signal is an additional input to PROMS 36 and 38, whereby the intended angular motor position is translated into appropriate quadrature signals for driving the two phase stepper motor 10. A block diagram of a system having feed forward velocity and feed forward acceleration is shown in FIG. 5. The addition of the FF signal provides a theoretically perfect and instantaneously responding system.

If $K_A = 1/\omega_o^2$ and $K_\omega = 2/\omega_o$, then the combined input to the system is:

$$X \text{ in} = 1 + SK_\omega + S^2 K_A = 1 + \frac{2S}{\omega_o} + \frac{S^2}{\omega_o^2} = \left( \frac{S}{\omega_o} + 1 \right)^2. \quad (3)$$

Substituting equation (3) into equation (2) yields:

$$\frac{X \text{ out}}{X \text{ in}} = \left( \frac{S}{\omega_o} + 1 \right)^2 \cdot \frac{1}{\left( \frac{S}{\omega_o} + 1 \right)^2} = 1 \quad (4)$$

The implementation of velocity FF can be accomplished in several different ways. One technique is to differentiate the tachometer analog signal, perhaps with an operational amplifier differentiator or a series capacitor of appropriate value to give the right time constant. This has the effect of subtracting the present velocity from the feedback, allowing only AC ringing signals to pass, which are the signals that are to be damped.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method for critically damping the natural resonance of a stepper motor, said method comprising the steps of:
    (a) generating position signals;
    (b) generating a digital velocity signal representing the velocity of the stepper motor shaft;
    (c) generating a digital error signal functionally related to said position signals and said digital velocity signal; and
    (d) generating command currents for driving the stepper motor and critically damping the natural resonance of the stepper motor in response to said digital error signal.

2. A method for critically damping the natural resonance of a stepper motor and compensating for lag comprising the steps of:
    (a) generating position signals;
    (b) generating a digital velocity signal representing the velocity of the stepper motor shaft;

(c) combining said position signal and said digital velocity signal in a digital subtractor and generating a digital error signal that is related to said position signal and said velocity signal;
(d) generating a digital feed forward signal; and
(e) generating command currents for driving the stepper motor and critically damping the natural resonance of the stepper motor in response to said digital error signal generated by said digital subtractor and said digital feed forward signal.

3. A method for critically damping the natural resonance of a stepper motor and for anticipating lag due to acceleration comprising the steps of:
(a) generating position signals;
(b) generating a velocity signal representing the velocity of the stepper motor shaft;
(c) combining said position signal and said velocity signal in a digital subtractor and generating a digital error signal related to said position signal and said velocity signal;
(d) generating a digital feed forward acceleration signal; and
(e) generating command currents for driving the stepper motor and critically damping the natural resonance of the stepper motor in response to said digital error signal generated by said digital subtractor and said digital feed forward acceleration signal.

4. A method for critically damping the natural resonance of a stepper motor and for compensating for positional lag due to feedback comprising the steps of:
(a) generating position signals;
(b) generating a velocity signal representing the velocity of the stepper motor shaft;
(c) combining said position signal and said velocity signal in a digital subtractor and generating a digital error signal related to said position signal and said velocity signal;
(d) generating a digital feed forward velocity signal which is proportional to velocity; and
(e) generating command currents for driving the stepper motor and critically damping the natural resonance of the stepper motor in response to said digital error signal generated by said digital subtractor and said digital feed forward velocity signal.

5. The method as claimed in claim 2 wherein said step of generating said digital velocity signal includes the steps of:
(a) generating an analog signal representing the velocity of the stepper motor shaft;
(b) applying said analog signal through a slew rate limiter, said slew rate limiter acting as a low pass filter without phase shift; and
(c) applying a signal at an output of said slew rate limiter to an analog to digital converter, said digital velocity signal presented at an output of said analog to digital converter.

6. An apparatus for controlling a stepper motor and for critically damping the natural resonance of the stepper motor, said apparatus comprising:
(a) digital processing means for developing a digital error signal related to a digital velocity signal representing the shaft velocity of the stepper motor and a digital position signal applied to the stepper motor; and
(b) means responsive to said digital error signal for generating command currents for driving the stepper motor and critically damping the natural resonance of the stepper motor.

7. An apparatus for controlling a stepper motor and critically damping the natural resonance of the stepper motor and for compensating for lag, said apparatus comprising:
(a) means for generating a position signal;
(b) means for generating a digital velocity signal representing the shaft velocity of the stepper motor;
(c) processing means for receiving said velocity signal and said position signal, said processing means generating a digital error signal related to said velocity signal and said position signal;
(d) digital means for generating a feed forward signal; and
(e) means responsive to said digital error signal and said feed forward signal for generating command currents for driving the stepper motor.

8. The apparatus as claimed in claim 7 wherein said digital means is a step rate generator and said feed forward signal is a feed forward acceleration signal, said feed forward acceleration signal operative to anticipate lag due to acceleration.

9. The apparatus as claimed in claim 7 wherein said digital means is a step rate generator and said feed forward signal is a feed forward velocity signal, said feed forward velocity signal operative to compensate for positional lag due to feedback from the stepper motor.

10. The apparatus as claimed in claim 7 wherein said means for generating said digital velocity signal includes:
(a) feedback means operatively connected to said stepper motor for generating a feedback signal representing the velocity of the stepper motor shaft;
(b) slew rate limiter means connected to said feedback means, said slew rate means operating as a low pass filter without phase shaft; and
(c) converter means operatively connected to said slew rate limiter for converting an analog signal at an output of said slew rate limiter means to a digital signal representing said feedback signal.

11. The apparatus as claimed in claim 7 wherein said processing means is digital subtractor means operatively connected to said converter means and said step rate generator means, said digital subtractor means generating said digital error signal which is related to said digital velocity signal and said position signal; and wherein said command current generating means includes PROM means operatively connected to said digital subtractor means and said step rate generator means, said error signal at an output of said digital subtractor means applied to one input of said PROM means, said feed forward signal applied to another input of said PROM means.

12. The apparatus as claimed in claim 11 wherein said PROM means includes a phase ONE PROM and a phase TWO PROM, each of said PROMS having first and second inputs, said digital error signal at said output of said digital subtractor means applied to said first input of each said PROM and said feed forward signal applied to said second input of each said PROM.

* * * * *